(12) United States Patent
Kojima

(10) Patent No.: US 8,315,259 B2
(45) Date of Patent: Nov. 20, 2012

(54) BASE STATION, APPARATUS, AND MOBILE STATION

(75) Inventor: Yuji Kojima, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 310 days.

(21) Appl. No.: 12/683,868

(22) Filed: Jan. 7, 2010

(65) Prior Publication Data
US 2010/0110965 A1 May 6, 2010

Related U.S. Application Data

(63) Continuation of application No. PCT/JP2007/064175, filed on Jul. 18, 2007.

(51) Int. Cl.
*H04L 12/28* (2006.01)
*H04J 3/06* (2006.01)
*H04B 7/00* (2006.01)

(52) U.S. Cl. .................. 370/390; 370/503; 370/310

(58) Field of Classification Search .............. 370/310, 370/390, 329, 312, 471, 350, 352, 356, 401, 370/431, 503, 508, 509, 510, 328, 337
See application file for complete search history.

(56) References Cited

U.S. PATENT DOCUMENTS 7,635,563 B2* 12/2009 Horvitz et al. ............... 435/6.11
7,636,577 B2* 12/2009 Mohanty et al. ............ 455/458

FOREIGN PATENT DOCUMENTS

JP 2000069523 3/2000

OTHER PUBLICATIONS

Notice of Reasons for Rejection dated Nov. 22, 2011 received in Japanese Patent Application No. 2009-523485.

* cited by examiner

*Primary Examiner* — Hanh Nguyen
(74) *Attorney, Agent, or Firm* — Murphy & King, P.C.

(57) ABSTRACT

First paging information is determined in advance according to the characteristics of delivered data for each channel of delivered multicast data, and the multicast data delivery frame of each channel is determined based on the first paging information. Paging information (second paging information) for a mobile station which selects a channel is determined from the first paging information determined for each selected channel. Due to this, multicast data delivery frame can be overlapped (is synchronized) with frames for monitoring for paging announcements, and power consumption for an MS in the idle mode can be reduced.

4 Claims, 13 Drawing Sheets

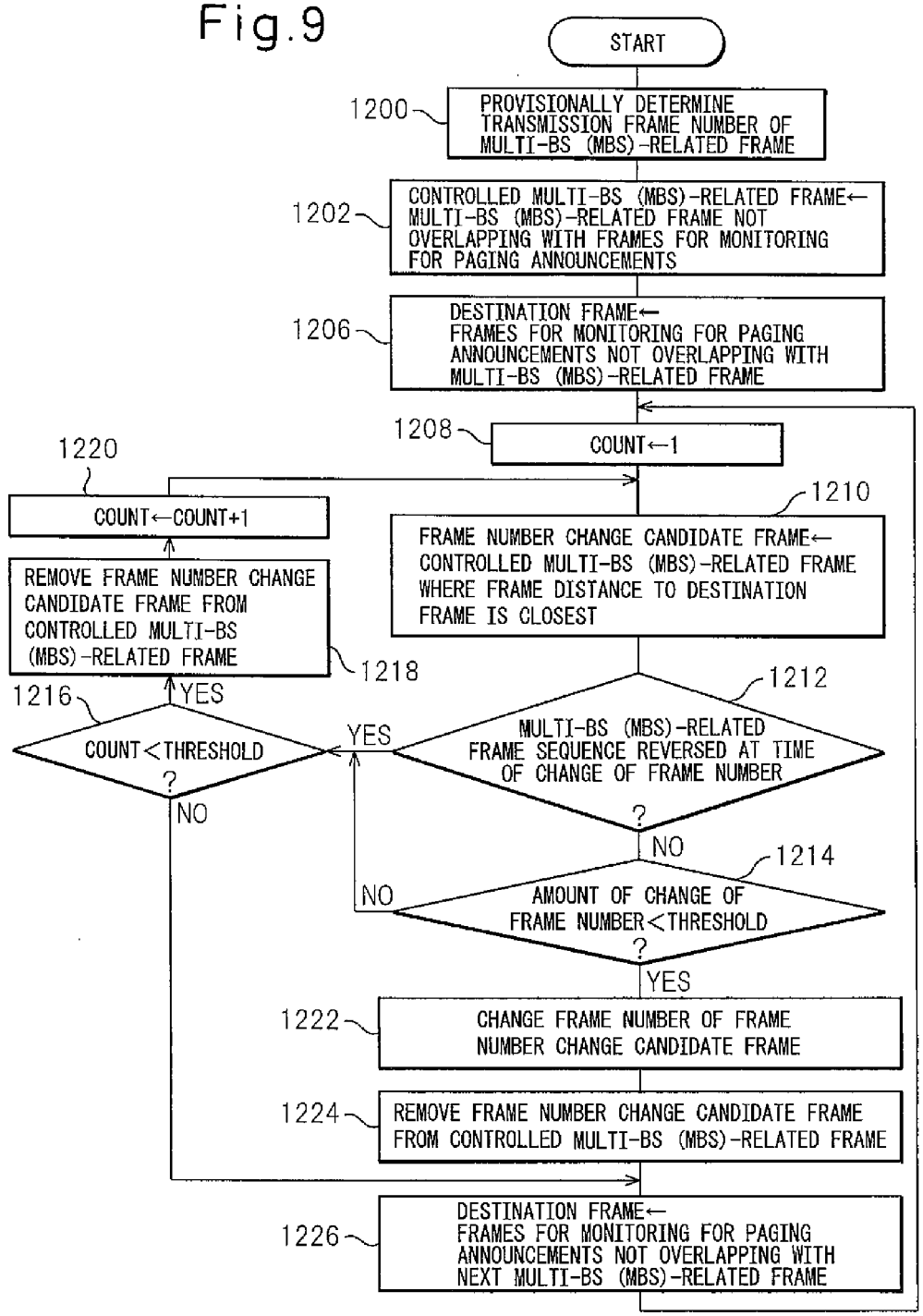

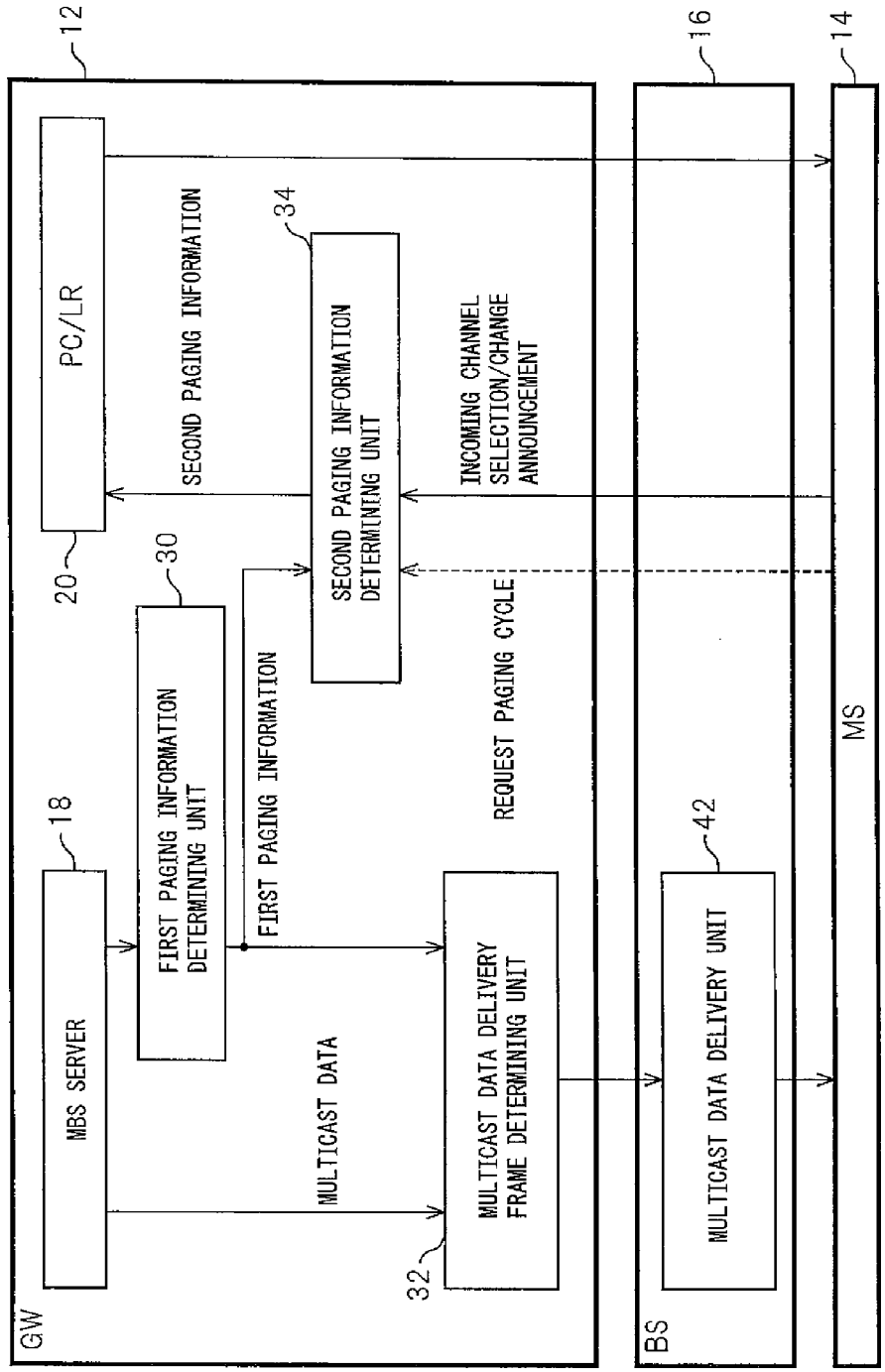

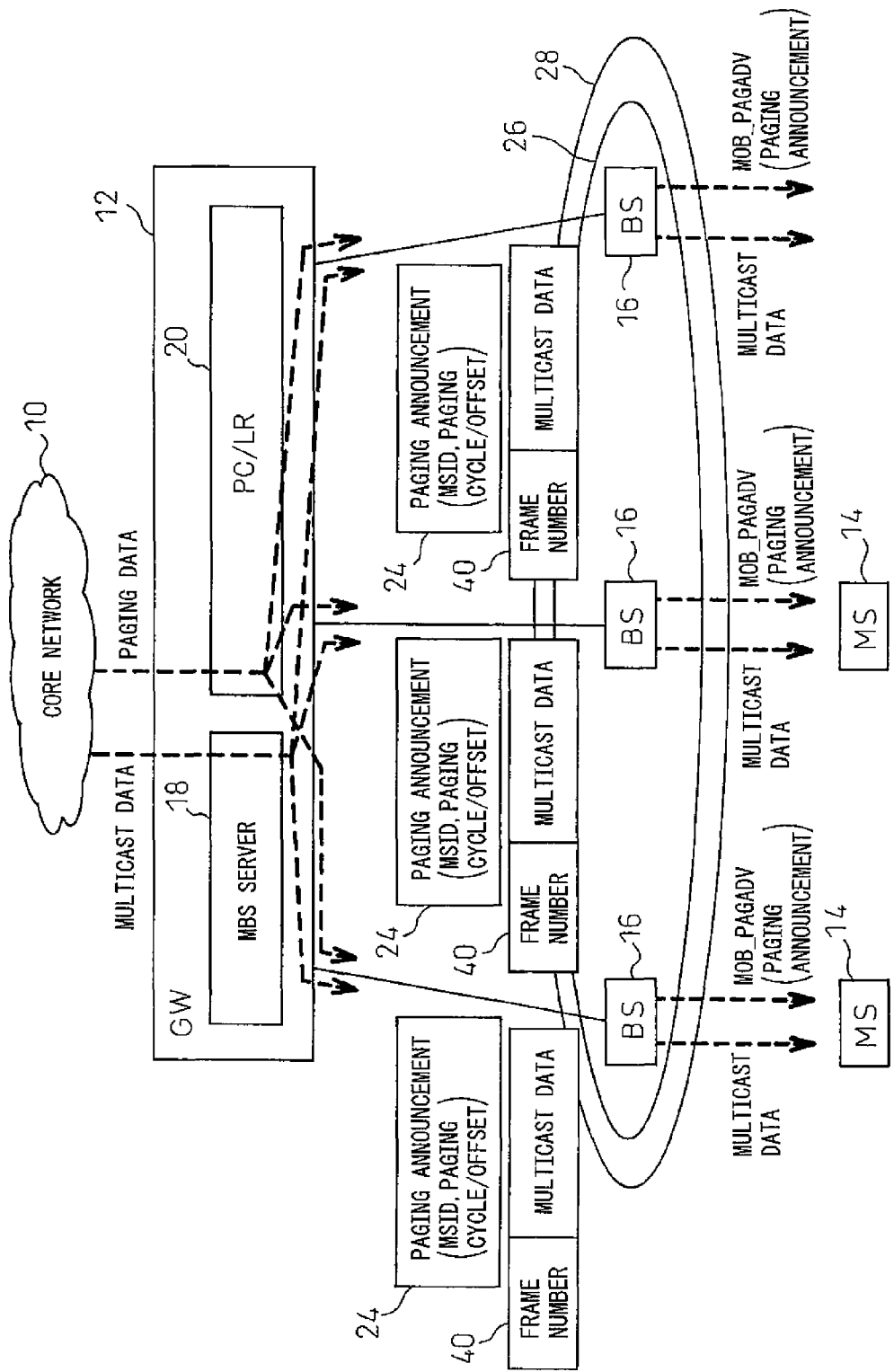

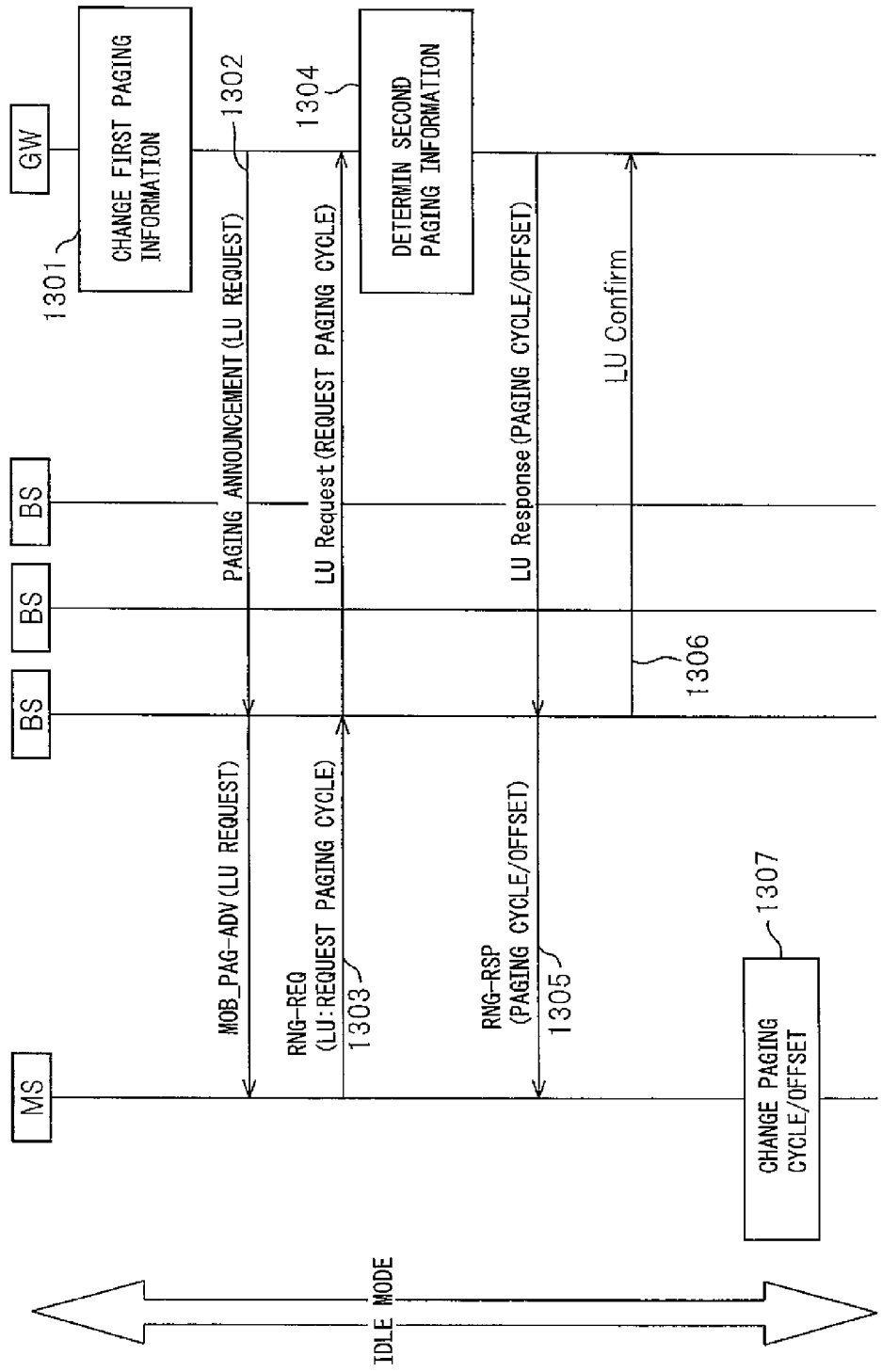

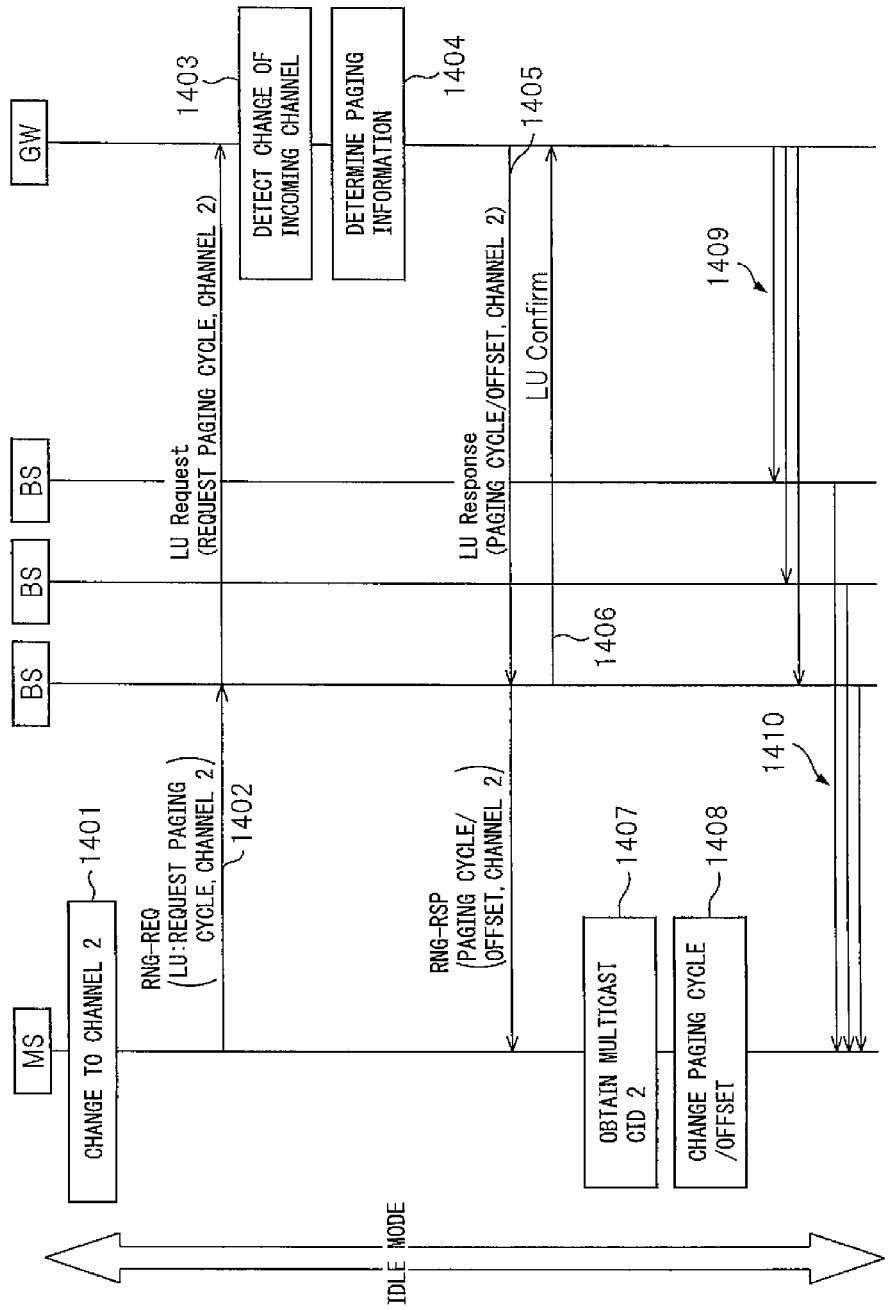

BASE STATION, APPARATUS, AND MOBILE STATION

CROSS-REFERENCES TO RELATED APPLICATION

This application is a continuation of International Application PCT/JP2007/064175, filed on Jul. 18, 2007, the contents of which are herein wholly incorporated by reference.

FIELD

The embodiments discussed herein relate to a base station transmitting multicast data to a mobile station, an apparatus notifying a mobile station of intermittently incoming frames, and a mobile station.

BACKGROUND

In recent years, work for standardizing WiMAX (Worldwide Interoperability for Microwave Access) wireless communication has been proceeding at the IEEE (Institute of Electrical and Electronic Engineers). WiMAX standards include the IEEE 802.16d for non-mobile subscriber stations (Subscriber Stations) (standardization completed) and the IEEE 802.16e for mobile subscriber stations (Mobile Stations: MS) (standardization underway).

The Description of the present application refers to a relay unit or relay system providing a multicast information transmission service such as a Multi-BS MBS (Multicast and Broadcast Service) supported by the latter MS-oriented IEEE 802.16e standard.

In such types of apparatuses and systems, multicast data is sent in intermittently set frames from a base station, so the MS receiving such data can cut power consumption by suspending the reception of data during frames where no data is sent.

For telephone services on the other hand, it is necessary for the MS being in the idle mode to monitor for a paging from a core network while the frames being monitored for paging announcement (frames for monitoring for paging announcements) are also intermittently set, so power consumption can be cut by suspending reception during the period of frames other than frames for monitoring for paging announcements.

In the related art, paging cycles and other paging information defining the frames for monitoring for paging announcements have been set for each MS to adjust the response time from an MS to paging.

Note that, in the IEEE 802.16e, an MS in the idle mode may also receive multicast data, however, no specific control method has been defined.

Patent Document 1: Japanese Laid-Open Patent Publication No. 2004-221760
Patent Document 2: Japanese Laid-Open Patent Publication No. 2004-159334
[Patent Document 3] Japanese Laid-Open Patent Publication No. 2004-135293

SUMMARY

Accordingly, it is an object of the embodiments to greatly cut the power consumed by an MS by appropriately setting the paging information and multicast delivery frames in such a relay apparatus.

According to an aspect of the embodiments, there is provided a base station using any frame of an incoming group of frames which a mobile station intermittently receives to send a paging announcement to the mobile station, the base station provided with a transmitter unit sending multicast-related data necessary for reception of multicast data using any frame of the incoming group of frames so as to enable reception of the multicast-related data by receipt of the incoming group of frames by the mobile station.

According to another aspect of the embodiments, there is provided an apparatus designating an incoming group of frames intermittently received by a mobile station, the apparatus provided with a control unit notifying the mobile station when a base station is transmitting multicast-related data necessary for reception of multicast data using any frame of a predetermined group of frames so that the mobile station intermittently receives a group of frames the same as the predetermined group of frames or a group of frames containing the predetermined group of frames.

According to still another aspect of the embodiments, there is provided a mobile station capable of receiving multicast data, the mobile station provided with a receiver unit receiving an announcement of an incoming group of frames intermittently received from a base station and receiving the incoming group of frames according to the announcement of the incoming group of frames and a control unit controlling, when multicast-related data is contained in a frame upon receipt of the frame belong to the incoming group of frames by the receiver unit, the receiver unit so as to receive the multicast data in accordance with the multicast-related data.

According to another aspect of the embodiments, there is provided a relay apparatus providing a multicast information transmission service to a mobile station through one of a plurality of channels, the relay apparatus provided with a first paging information determining unit for determining in advance, for the channel of the information transmission service, first paging information defining frames for monitoring for paging announcements to be monitored for by the mobile station, a data delivery frame determining means for determining a frame delivering the data of the information transmission service based on the first paging information determined in advance for each of the channels, and a second paging information determining unit for determining, for a mobile station selecting at least one of the plurality of channels, second paging information defining frames for monitoring for paging announcements based on the first paging information defined in advance for one of the channels selected by the mobile station.

By defining the paging information for each channel of the information transmission service selected by a mobile station, data of a multicast information transmission service can be transmitted in synchronization with the frames being monitored for paging announcements. Due to this, the idle period can be made longer, and the power consumption of a mobile station can be cut greatly.

BRIEF DESCRIPTION OF DRAWINGS

FIG. 9 is a flowchart illustrating an example of a method of determining a multicast data delivery frame.

FIG. 10 is a block diagram illustrating a configuration of a system according to a second embodiment.

FIG. 11 is a view illustrating a configuration of a network according to a second embodiment.

FIG. 12 is a view illustrating a control sequence according to a third embodiment.

FIG. 13 is a view illustrating a control sequence according to a fourth embodiment.

DESCRIPTION OF EMBODIMENTS

In the embodiments, a base station uses any frame in an incoming group of frames intermittently received by a mobile station in order to send a paging announcement to the mobile station. The base station sends multicast-related data necessary for reception of multicast data by using any frame in an incoming group of frames. To do this, there is provided a transmitter unit which enables the mobile station to receive multicast-related data by reception of the incoming group of frames. Due to this, reception of multicast data by the mobile station is carried out efficiently. Note that, the timing for sending the paging announcement is preferably determined by a higher apparatus for the base station.

Figure 1:
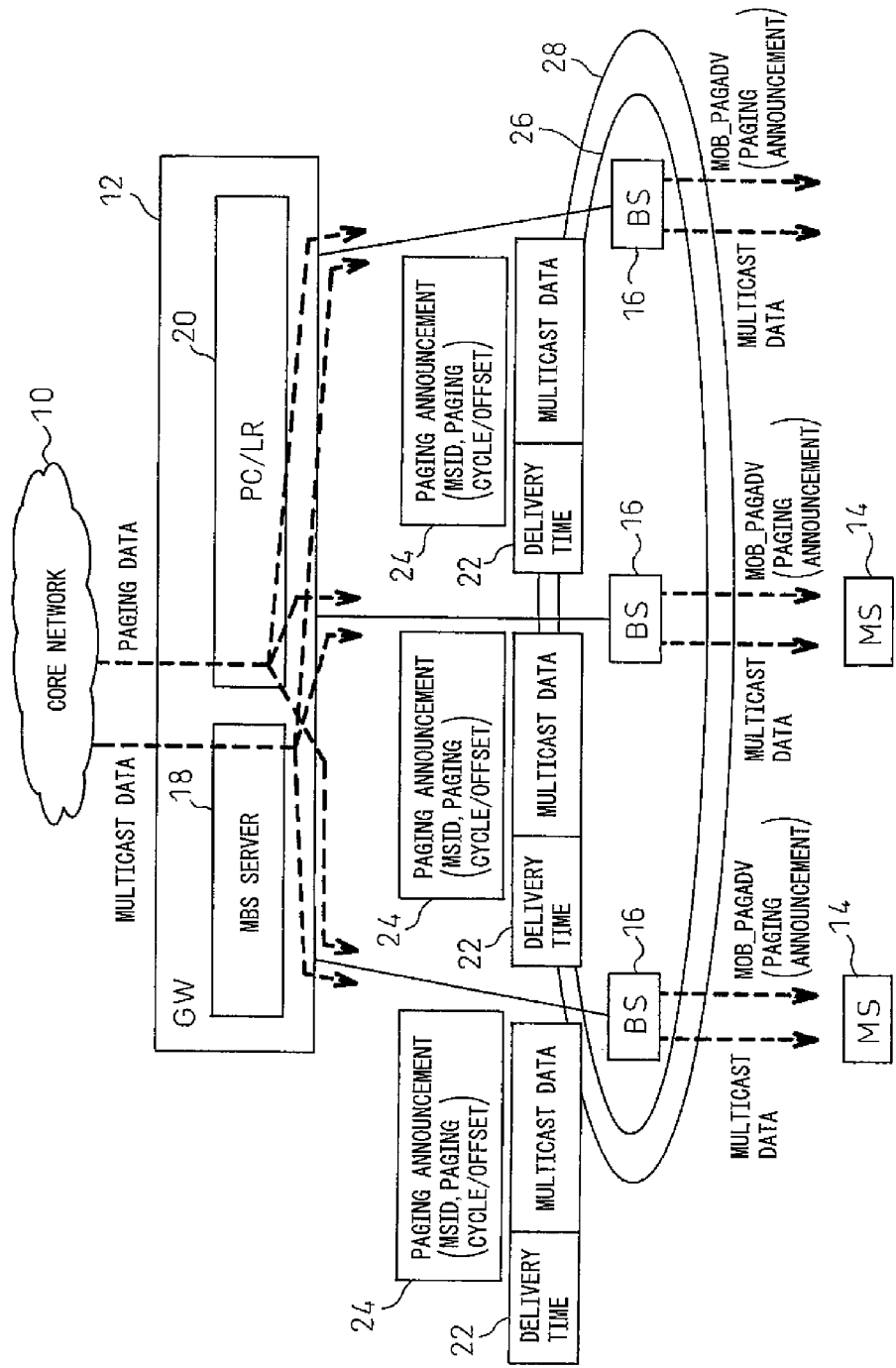
FIG. 1 is a view illustrating an example of a network configuration in which the embodiments are applied.

FIG. 1 illustrates an example of the configuration of an access network realizing an IEEE 802.16e-supported Multi-BS MBS, as an example of a relay apparatus or relay system able to provide a multicast information transmission service to the user of a mobile station (MS).

This access network is provided with a gateway (GW) 12 connected to a core network 10 and a plurality of base stations (BS) 16 connected, on one hand, to the GW 12 and connected, on the other hand, wirelessly to MS's 14. Note that, the GW may also be called a higher apparatus for the BS's because it is positioned higher than the BS's.

The GW 12 contains an MBS server 18 for providing a multicast/broadcast information transmission service MBS and a paging controller/location register (PC/LR) 20 for providing a telephone service. The GW 12 manages a plurality of BS's 16 connected to it.

The MBS server 18 receives multicast data from the core network 10, determines the delivery time, assigns the determined delivery time to the multicast data (22), and sends the data to a plurality of BS's 16.

The PC/LR 20 is a function block administering the idle mode/paging. If receiving incoming data for MS's in the idle mode from the core network 10, it sends a paging announcement 24 to a plurality of BS's.

In Multi-BS MBS, a plurality of BS's form an MBS zone. The BS's contained in the same MBS zone broadcast the same multicast data at the same timing by using the same sub channels, symbols, modulation schemes, and multicast CIDs (connection IDs). In the example illustrated in FIG. 1, three BS's 16 make up the MBS zone 26. On the other hand, so long as an MS 14 is moving within the same MBS zone, since any of the BS's within the zone broadcasts the same multicast data as mentioned above, the MS 14 can continue to receive multicast data without having to register (reregister) in a specific BS.

Figure 2:
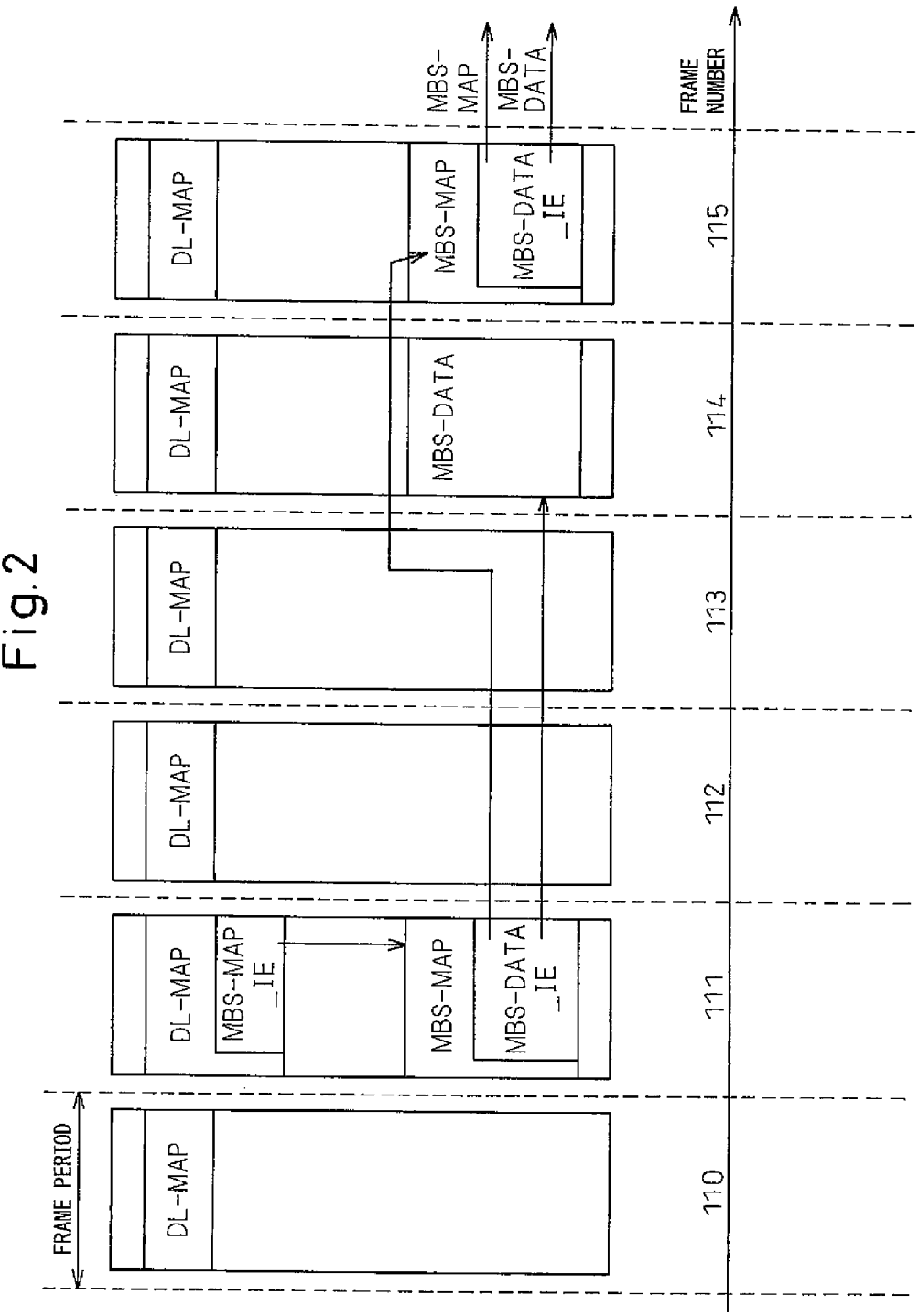
FIG. 2 is a view illustrating an example of the configuration of a frame which delivers multicast data in the network of FIG. 1.

Further, once an MS 14 receives a frame containing multicast data, since the number of the next frame by which multicast data is delivered is known, in the period up to then, it can enter the idle period and cut power consumption (see FIG. 2). The reason why the MS knows the number of the next multicast data delivering frame is because the number of the next frame by which multicast data is delivered is described in the received frame. A BS 16 configures frames in such a way. In the example of FIG. 2, when the MS receives a frame of frame number=111, the MS knows a frame by which the next multicast data is delivered will be the frame with frame number=114, so if it is not necessary to temporarily monitor paging announcements in a telephone service, the MS can enter the idle period during the period in which the frames with frame number=112 and 113 are being sent.

Each frame in FIG. 2 will be explained next. The MS receives MBS-MAP_IE in the DL-MAP of the frame with frame number=111. The DL-MAP defines the configuration relating to the downlink (DL) of a frame, where the MBS-MAP_IE is one of the information elements in the DL-MAP. The MBS-MAP_IE in the frame of number=111 indicates the region containing the MBS-MAP message in the frame. The MBS-MAP_IE contains the symbol offset etc. within the frame to indicate the position of the region. The MS receives the MBS-MAP_IE and thereby can read next the MBS-MAP message. The MBS-MAP message contains the MBS-DATA_IE as an information element. The MBS-DATA_IE indicates the frame (frame number=114) by which next multicast data is delivered and also the region of the frame where the multicast data is contained. Further, the MBS-DATA_IE indicates the frame by which the next MBS-MAP message is delivered (frame number=115) and the region in the frame where the MBS-MAP message is contained. The content the MS requires to receive, that is, the multicast data, is transported by the MBS-DATA of FIG. 2. The other MBS-MAP_IE, MBS-MAP, and MBS-DATA_IE are control data necessary for reception of the multicast data. In order for the MBS-DATA_IE to indicate a frame by which the multicast data is delivered, a frame by which the MBS-MAP message is delivered, and the regions within the frames of each, the MBS-DATA_IE contains the frame offset, symbol offset within the frame, subchannel offset within the frame, etc. By receiving the MBS-MAP message containing the MBS-DATA_IE, the MS is able to read the frame by which next multicast data is delivered and the frame by which the next MBS-MAP message is delivered. If the MS can receive the next MBS-MAP message, it can read the frame by which the further next multicast data is delivered and the frame by which the further next MBS-MAP message is delivered, so thereinafter the MS can sequentially receive the multicast data without receiving and decoding the MBS-MAP_IE in the DL-MAP.

Note that, in FIG. 2, the MBS-MAP contains just one MBS-DATA_IE, but according to the IEEE 802.16e standard, the MBS-MAP is able to contain a plurality of MBS-DATA_IE. Thus, each MBS-DATA_IE describes the multicast CID of the multicast data which is indicated by the MBS-DATA_IE, so when delivering a plurality of multicast channels, the MS can selectively receive only the multicast channel which the MS desires to receive, that is, only the multicast data of the multicast CID which the MS desires to receive.

In the related art, a frame delivering multicast data is determined based only on the delivery time (absolute time) attached to the multicast data. For example, a BS 16 determines the frame closest to the assigned delivery time as the frame for delivering the multicast data. In this determination method, it is necessary for all the BS's in the MBS zone to use the same method for determination so as to keep the timing of the frames delivering the multicast data from deviating.

The GW 12 measures the delay between the BS and GW periodically. Based on the measurement results, it determines the delivery time in which delivery by the BS's 16 is possible. Further, when the MBS server 18 of the GW 12 assigns delivery times to the BS's 16, it synchronizes the absolute time between the BS's 16 in the MBS zone 26 and the GW 12 including the MBS server 18. As a synchronizing method, for example, there is a method of providing the BS's 16 and GW 12 with a GPS (Global Positioning System) for delivering the time, usage of NTP (Network Time Protocol), etc.

An MS 14 in the idle mode, without being registered at a specific BS 16, periodically monitors whether a BS 16 broadcasts a paging announcement. In the event of a broadcast, it recognizes that traffic (paging data) addressed to the MS 14 has been sent, leaves the idle mode, and receives the paging data. By this, paging to the MS 14 is realized. In the example of FIG. 1, the BS's 16 broadcast the IEEE 802.16e MAC management message, that is, the MOB_PAG-ADV, as a paging announcement.

In the example in FIG. 1, three BS's 16 make up a paging group 28. An MS 14 in the idle mode does not register itself at a specific BS 16, but announces what paging group it is in to the PC/LR 20. The PC/LR 20 sends a paging announcement to all the BS's 16 that belong to the paging group in which the MS 14 exists.

The MS determines the monitored frame number based on the paging cycle and paging offset determined for each MS. In other frame periods, the MS enters the idle period, and therefore it can cut the power consumption. The condition for the frame number of the start frame of the frames for monitoring of the paging announcement is as follows.

Figure 3:
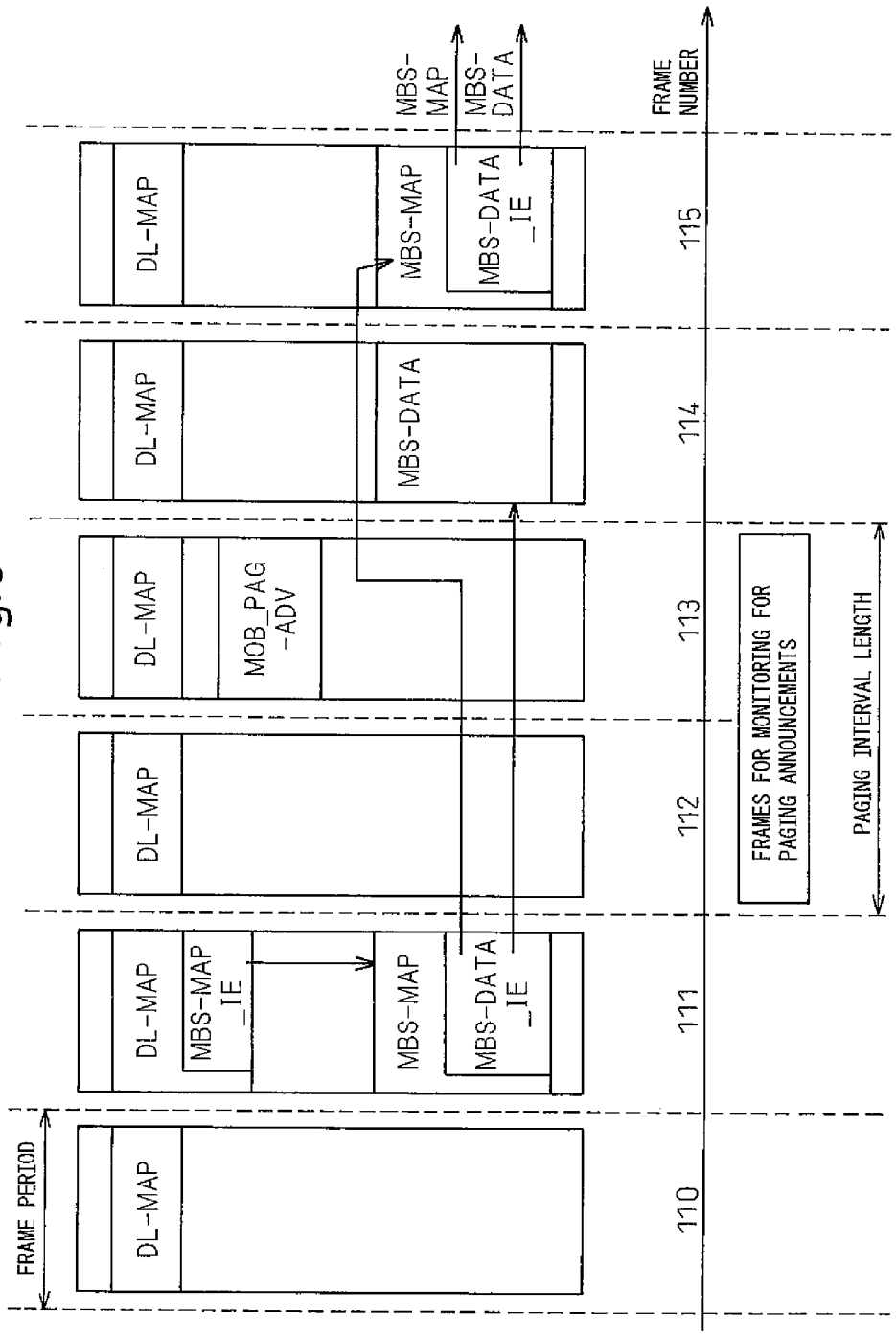
FIG. 3 is a view explaining the relationship between frames delivering multicast data (Multi-BS MBS-related frame) and frames for monitoring for paging announcements.

Frame number modulo paging cycle=paging offset For example, in the case of paging cycle=10 [frame], paging offset=2 [frame], and paging interval length=2 [frame], as illustrated in FIG. 3, the frames with frame number=112 and 113 are the frames for monitoring for paging announcements. Here, the paging interval length is a set value by the system. Conventionally, the paging cycle and paging offset are values differing for each MS and are determined between the PC/LR and the MS upon entry into idle mode. The PC/LR 20, when sending a paging announcement to the BS 16, includes in the paging announcement message the MSID, paging cycle, and paging offset of the MS being paged (FIG. 1). The BS 16 calculates the frame numbers of the frames for monitoring for paging announcements from the above equation and sends the MOB_PAG-ADV (contained in the frames) at the timings of sending the frames with the calculated frame numbers. Note that, the paging cycle is changed for each MS so that the response time of the MS to paging can be adjusted for each MS. A shorter paging cycle enables a shorter response time, but frames for monitoring for paging announcements occur more frequently, which makes power consumption of the MS greater. Further, the paging offset is changed for each MS so that MOB_PAG-ADV's do not concentrate in specific frames. This is because if MOB_PAG_ADV's concentrate in specific frames, the bandwidth in which user data can be transported by the frames becomes smaller.

If determining the paging cycle, paging offset, and other paging information independently from the multicast data for each MS for example, as illustrated in the example of FIG. 3, the situation where the frames of the idle period from the viewpoint of receiving multicast data, that is, frame numbers=112 and 113, become frames for monitoring for paging announcements arises. This is disadvantageous from the viewpoint of low power consumption.

Figure 4:
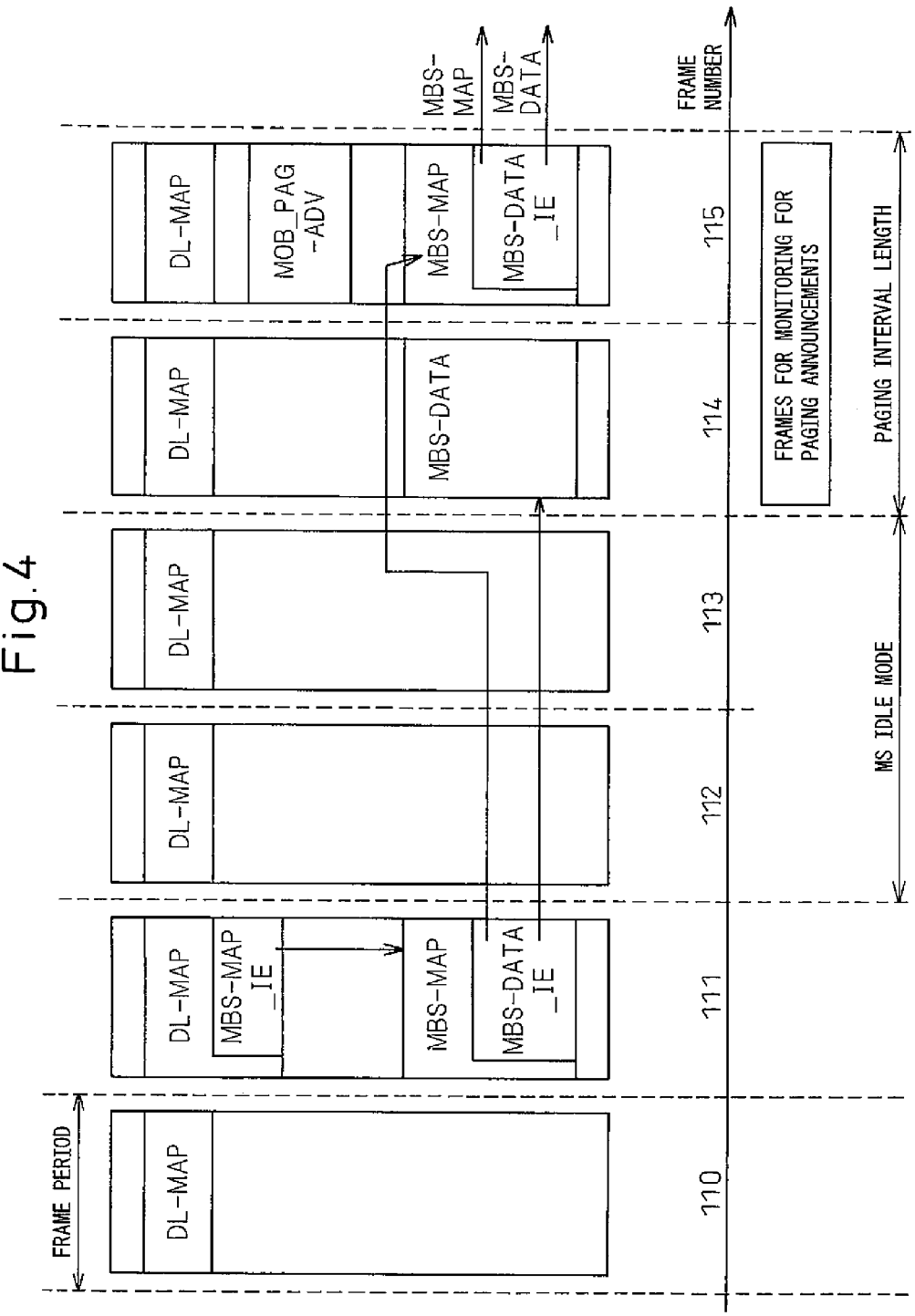
FIG. 4 is a view explaining synchronizing the Multi-BS MBS-related frames with the frames for monitoring for paging announcements.

In the embodiments, as illustrated in FIG. 4, the timing for sending data of a broadcast information transmission service, such as the Multi-BS MBS-related frames, sent from the BS's and the frames for monitoring for paging announcements of the MS in the idle mode are synchronized so as to slash the frames that need to be received, which realizes lower power consumption for an MS.

In FIG. 4, Multi-BS MBS-related frames (for example, frames for sending data necessary for receipt of multicast data or frames for sending multicast data) are sent at the frames for monitoring for paging announcements of the MS, that is, at the frames with the frame numbers=114 and 115. Thus, the MS, unlike in FIG. 3, can enter the idle period during the frames with the frame numbers=112 and 113 are being sent.

The embodiments determine the frames for monitoring for paging announcements, conventionally determined for each MS, based on the channel selected by the user so as to match the multicast delivery frames and frames for monitoring for paging announcements. By doing so, the above-mentioned synchronization of frames is essentially realized. Note that, even though referring to "match", a complete match is not necessary. For example, at least the multicast-related frame in the frames for monitoring for paging announcements is sent or information designating the transmission region of the multicast data (timing, subchannel, and other information) in the frames for monitoring for paging announcements is sent. Further, the MS receives a radio signal sent at the designated transmission region if the indication of the designated transmission region of the multicast data is detected by receiving frames for monitoring for paging information. Here, it is preferable that the designated transmission region also be frames for monitoring for paging announcements.

Figure 5:
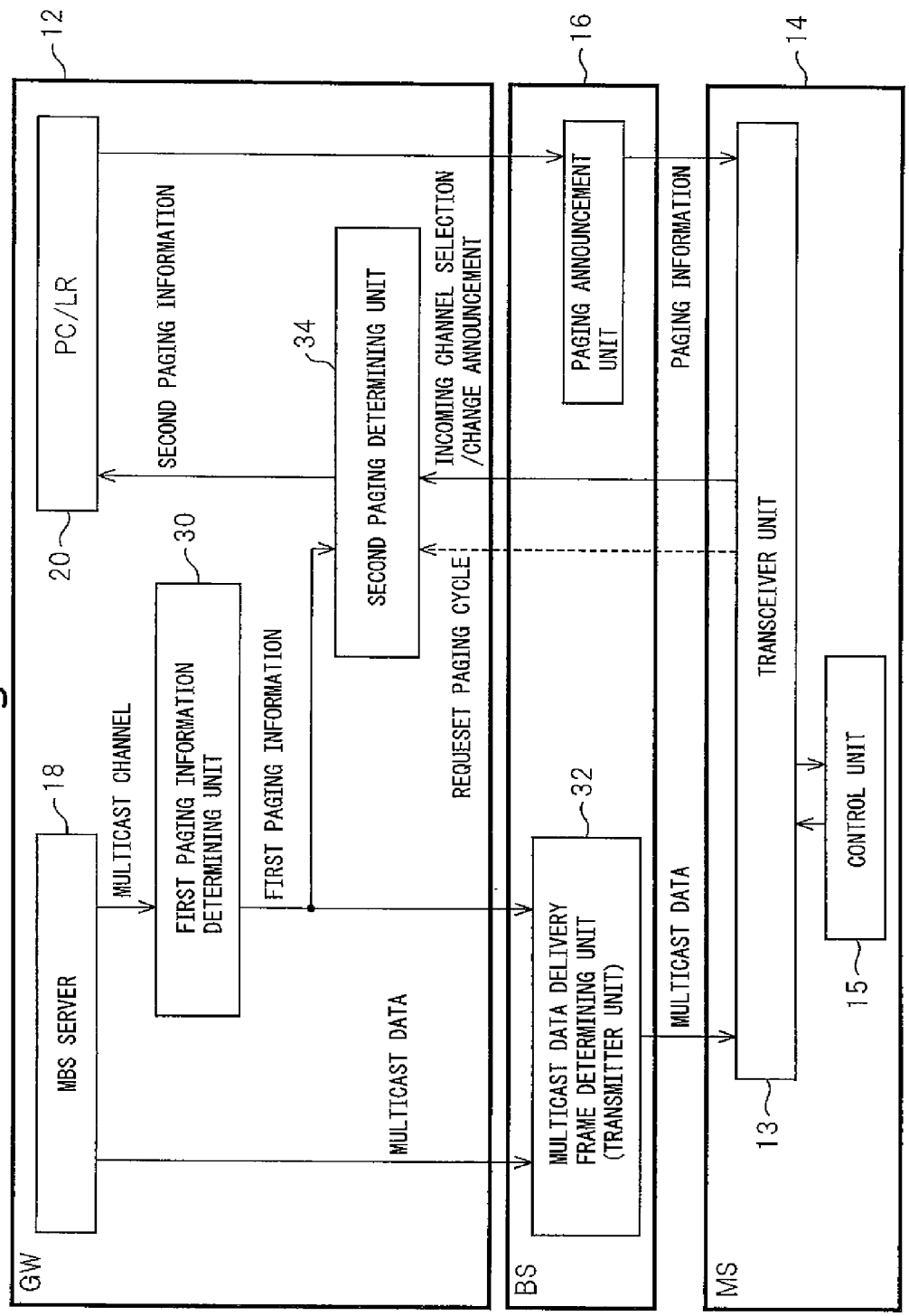
FIG. 5 is a block diagram illustrating the configuration of a system relating to a first embodiment.

FIG. 5 illustrates an example of a configuration for realizing this. For each channel (CID) of the multicast data delivered from the MBS server 18, a first paging information determining unit 30 installed in the GW 12 considers, for example, the data characteristics of each channel and determines the paging cycle, paging offset, and other paging information as "first paging information". The determined first paging information is notified to the multicast data delivery frame determining unit 32 in the BS 16. The multicast data delivery frame determining unit 32 determines the multicast data delivery frames of each channel (selects frames for sending multicast-related data from among the determined frames for monitoring for paging announcements) to synchronize them with the frames for monitoring for paging announcements that the "first paging information" determined for each channel (CID) determines and delivers the multicast-related data (multicast data) from the MBS server 18 to the MS 14.

The MS 14 selects one of the channels of the multicast data delivered from a BS 16 and begins to receive the multicast data. At this time and at the time when the channel (CID) selected at the MS is changed, the selected or changed channel is notified to the second paging information determining unit 34 through the BS 16 from the transceiver unit 13 of the MS 14. The second paging information determining unit 34 determines second paging information based on the paging information corresponding to the channel selected by the MS 14 among from the first paging information that the first paging information determining unit 30 determines for each channel, notifies the determined information to the PC/LR 20, and requests change of information to the notified information. At this time, if there is a request for a paging cycle (request paging cycle) from the MS, the second paging information is determined considering the request. The details are mentioned later. The PC/LR 20 changes the paging information of the relevant MS to the one notified, notifies the changed paging information to the MS 14, then instructs the BS 16 to send the paging data by using the frames for monitoring for paging announcements that the changed paging information defines hereafter. Note that, a case where two information determining units, the first paging information determining unit and second paging information determining unit, were installed was explained, but the embodiments are not limited to this configuration.

That is, it is sufficient for the multicast data delivery frame determining unit (transmitter unit) 32 of the BS to send multicast-related data to the mobile station by using any of the frames contained in a predetermined group of frames (G). However, it is sufficient that the predetermined group of frames (G) is a group of frames which is the same as (or frames included in the group of frames) to be received intermittently by the mobile station (preferably all the mobile stations of the BS that receive multicast-related data) to which the multicast-related data is sent. For a GW which is a paging information creating apparatus creating paging information, it is sufficient to be provided with a PC/LR 20 (control unit) which instructs a certain mobile station receiving multicast data to receive intermittently a group of frames, the same as the predetermined group of frames (G), or frames containing the group of frames (G). Note that, if there are a plurality of channels sending multicast data, it is sufficient for a predetermined group of frames (Gchx) to be identified, for each channel, and the corresponding predetermined group of frames (Gchx) to be used as the predetermined group of frames (G) and processed similarly as above.

The transceiver unit 13 of the MS 14 receives announcement (second paging information) of the incoming group of frames and, according to the announcement, intermittently receives a group of frames. The control unit 15 controls the transceiver unit 13, so as to receive multicast data in accordance with received multicast-related data, when multicast-related data is contained in frames belonging to the group of frames that the transceiver unit 13 receives.

The paging information includes for example the paging cycle, paging offset, and paging interval length. In the standard, the paging cycle and paging offset differ for each MS, while the paging interval length is a unique fixed value for the system. Accordingly, the paging interval length may be set, in advance, in each device, without including it in the paging information, when installing actually. Further, depending on the system, there is also a case where the paging interval length differs for each MS in operation. In this case, the paging interval length is included in the paging information. Further, depending on the system, there is also a case where the paging cycle is set as a unique fixed value for the system. In this case, similarly, the paging cycle may be set, in advance, in each apparatus without including it in the paging information. The paging information is to include at least dynamically changed parameters among the parameters which are necessary to determine the frames for monitoring for paging announcements.

Note that, in the example illustrated in FIG. 5, the first paging information determining unit 30 and second paging information determining unit 34 are installed in the GW 12 and the multicast data delivery frame determining unit 32 is installed in the BS 16. However, the WiMAX Forum NWG (Network Working Group) standard also defines an integrated apparatus of the BS and GW. In this case, the BS should be provided with all functions.

Further, the provision of these functions in the GW 12 and BS 16 is not limited to the configuration of FIG. 5. These functions may be included in the GW 12 and BS 16 as a whole.

Embodiment 1

Below, a first embodiment will be explained in further detail.

Method of Announcing First Paging Information

Figure 6:
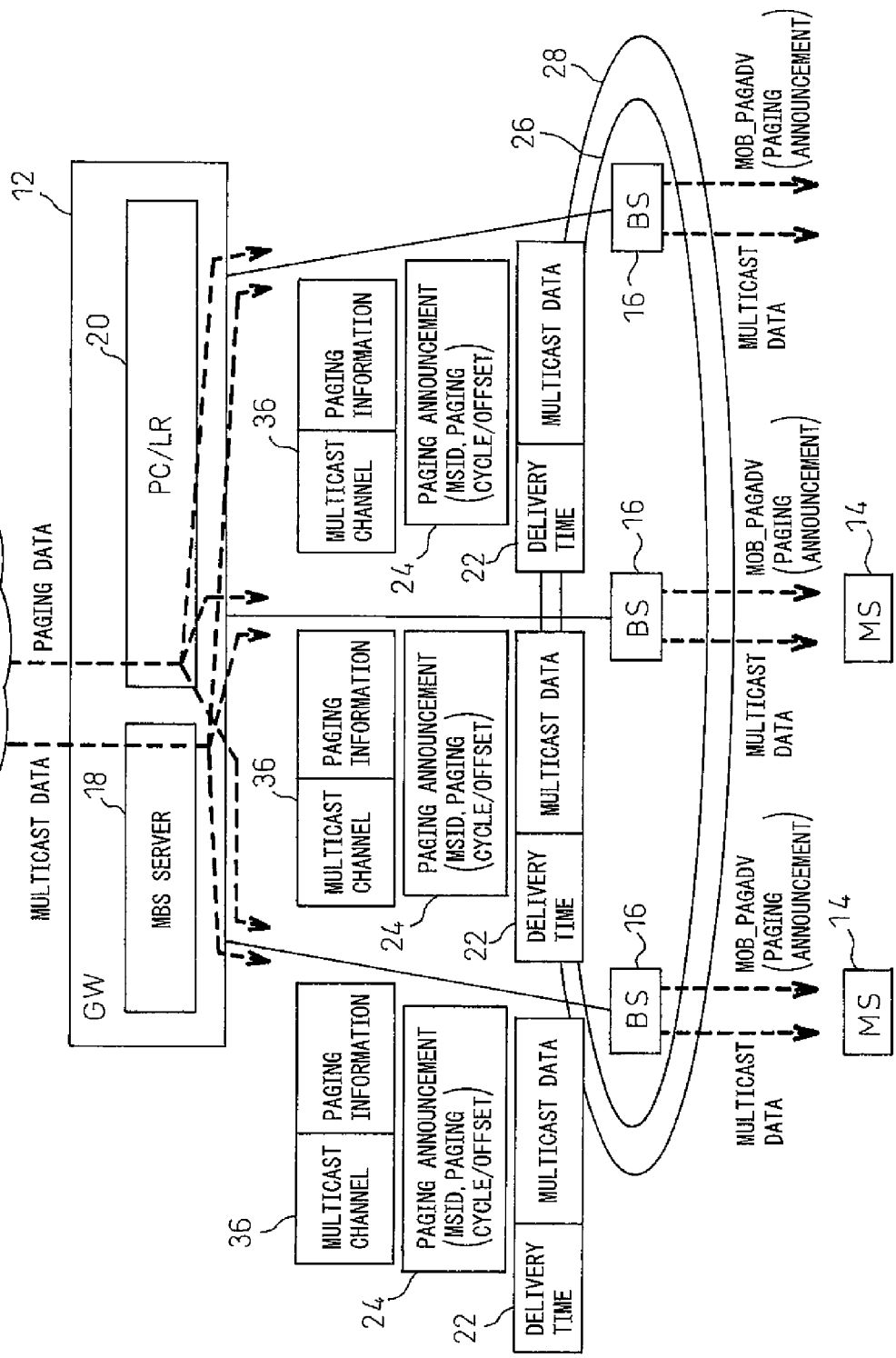
FIG. 6 is a view illustrating a configuration of a network relating to a first embodiment.

In the first embodiment illustrated in FIG. 6, in addition to what is shown in FIG. 1, the GW 12 announces first paging information to the BS 16. The announcement message 36 announcing the first paging information is composed of a multicast channel and paging information corresponding thereto. When sending a plurality of first paging information, the paging information announcement message 36 contains a plurality of multicast channels and a plurality of paging information corresponding thereto. The GW 12 sends the announcement message 36 when the GW 12 and the BS 16 are connected to the core network 10, when the paging information for a multicast channel is changed, and when the configuration of a multicast channel is changed (for example, increasing or decreasing multicast channels), respectively. Further, the GW 12 may also send paging information announcement message 36 relating to an MS-requested multicast channel, not when the GW 12 and BS 16 are connected to the network, but when an MS requesting multicast channel reception appears first in the MBS zone 26.

Assumptions of Network Operation for Embodiment 1

In the first embodiment, the network is operated in the following way as an example. The following is not defined in the IEEE 802.16e standard and WiMAX Forum NWG standard and can be operated freely.

1. A multicast channel, IP multicast address, and multicast CID are operated in a one-one-one relationship.

2. An MS acquires an IP multicast address of a multicast channel which the MS needs to receive from a content server, whereby a service flow designating the IP multicast address is established between the MS and BS, so as to enable reception of multicast data having a related multicast CID.

3. A multicast channel which an MS can simultaneously receive is basically made one channel. Further, when an MS allows to receive a plurality of multicast channels simultaneously, the paging information of the MS is determined to match to the latest multicast channel from among the multicast channels requested by the MS to receive.

4. The BS's in the same MBS zone synchronize the frame numbers with each other.

According to items 1 and 2 as above, a method is stipulated in which an MS designates to a network the multicast channel (=equivalent to a TV channel) which the MS is seeking to receive. In the standards, there is no stipulation as to how to obtain the IEEE 802.16e layer multicast CID corresponding to the contents which the MS seeks to receive. In the above, the multicast channel is linked with the multicast CID by an intervention of an IP multicast address. If the multicast CID is known, the MS can receive multicast data according to the specification of the IEEE 802.16e.

Note that, the above "content server" is a main server storing contents to be delivered through multicast channels and is generally installed in the core network 10.

In item 4, if the frame numbers of frames sent at a certain time between BS's do not match, even if paging information matches between BS's, the frames for monitoring for paging announcements will differ between BS's, and therefore synchronization of the transmission timings of the Multi-BS MBS-related frames from the BS's with the frames for monitoring for paging announcements will not be achieved.

Accordingly, the BS's in the same MBS zone will have to synchronize the frame numbers. As a synchronization method therefor, there is, for example, a method of determining the frame numbers based on the absolute time which the BS's can obtain by a GPS. The embodiments do not exclude other methods of synchronizing frame numbers.

Further, the embodiments are capable of solving the problem without changing the standard message (=MS-BS message) of the IEEE 802.16e.

Method for Determining First Paging Information

TABLE 1

| Multicast channel | Paging information | |
|---|---|---|
| | Paging cycle | Paging offset |
| 1 | Paging cycle 1 | Paging offset 1 |
| 2 | Paging cycle 2 | Paging offset 2 |
| 3 | Paging cycle 3 | Paging offset 3 |

As illustrated in Table 1, the first paging information determining unit 30 (FIG. 5) in the GW 12 determines the first paging information for each multicast channel in advance. This is for separately defining the group of frames which sends the multicast-related data for each multicast channel. If the group of frames for each multicast channel is the same, then certain first paging information may be determined for them uniformly. In Table 1, the paging information is set as the paging cycle and paging offset. As mentioned above, the paging information may also include the paging interval length. With respect to the method for determining the first paging information, at the minimum, it is sufficient that at each multicast channel, some set of paging information be uniquely determined. However, there are the following tendencies, so taking these into consideration, preferably the first paging information determining unit 30 determines the first paging information.

Generally, multicast data has data characteristics for each multicast channel. This is, for example, at every what cycle the multicast data is sent etc. The paging cycle is preferably the same cycle as the transmission cycle of the multicast data. The transmission cycle of the multicast data may be obtained from the content server. If the paging cycle is made shorter than the transmission cycle of the multicast data, the MS has to monitor frames other than at instances of receiving incoming multicast data as well. This is disadvantageous from the viewpoint of power consumption of the MS. On the other hand, by making the paging cycle longer than the transmission cycle of multicast data, the response time from the MS with respect to the paging announcement becomes longer. Even if making the paging cycle longer, the multicast data must be received at shorter intervals than the longer paging cycle, so MS power consumption will not become lower.

The paging offset is set so that the frames for monitoring for paging announcements do not overlap with those of other channels. It is preferable to determine it so that frames for monitoring for paging announcements to the MS do not concentrate at one frame.

The paging interval length is set from 2 to 5 frames in the IEEE 802.16e standard. Thus, the range of possible modification of the interval length is limited, but when the number of receiving MS's per multicast channel becomes large, the range is preferably made broader. In the IEEE 802.16e standard, the paging announcement, that is, MOB_PAG-ADV, may be broadcast by using any of the frames in the paging interval, so longer paging interval lengths can prevent concentration of paging announcements at one frame.

Further, as explained above, the first paging information determined for each channel is announced from the first paging information determining unit 30 in the GW 12 to the multicast data delivery frame determining unit 32 of the BS 16.

Explanation of Control Sequence

Below, a first embodiment will be explained according to the sequence diagram of FIG. 7.

Figure 7:
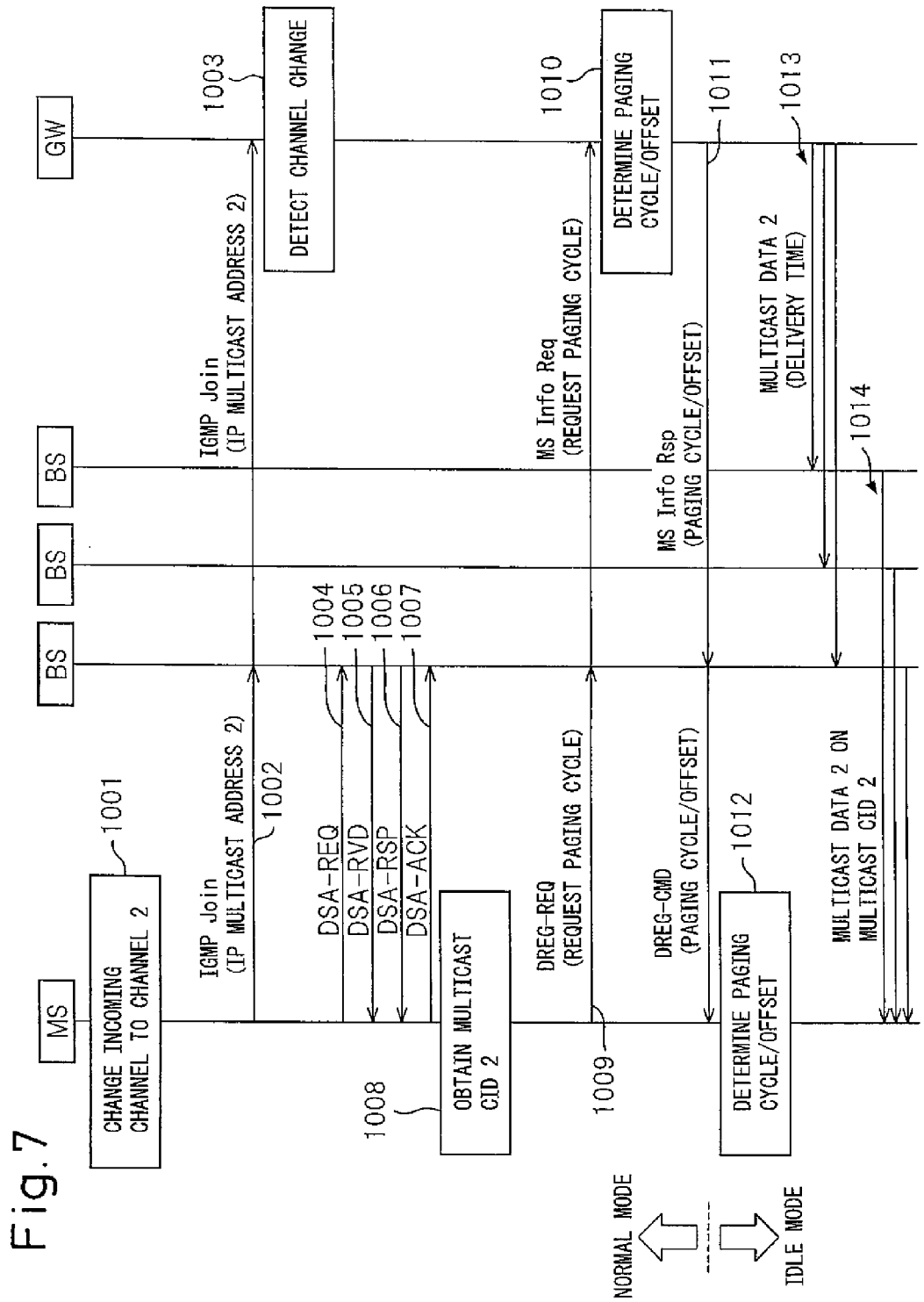
FIG. 7 is a view illustrating a control sequence in a first embodiment.

FIG. 7 describes the flow, for the MS, from a change of the incoming multicast channel to a reception of the multicast data of the multicast channel. In this sequence, the MS shifts from normal mode to idle mode. Even in cases where the MS newly requests reception of a multicast channel, realization by a similar method is possible by assuming the newly incoming multicast channel as the changed incoming multicast channel in FIG. 7. Further, in a case where the MS is in the idle mode and when changing the incoming multicast channel or newly receiving a multicast channel, the MS must leave the idle mode once then enter the normal mode in order to inform the incoming multicast channel to the access network, and therefore the method after entering the normal mode is similar to FIG. 7 ultimately.

Step 1001: The MS changes the incoming multicast channel to a multicast channel 2.

Step 1002: The MS acquires from the content server in advance an IP multicast address 2 corresponding to the multicast channel 2, sends an IGMP (Internet Group Management Protocol) Join message containing the IP multicast address 2 to the GW through the BS, and joins the IP multicast group of the IP multicast address 2. That is, the MS sends an incoming multicast channel change announcement by the IGMP Join message.

Step 1003: The second paging information determining unit 34 in the GW detects the change of the incoming multicast channel of the MS.

Steps 1004 to 1007: The transmission and reception of DSA-REQ/RVD/RSP/ACK messages defined in IEEE 802.16e between the MS and BS establishes a service flow for the multicast data 2 of the multicast channel 2. By establishing the service flow, if the BS receives multicast data 2 with an IP multicast address 2, it broadcasts it to the downlink by using the multicast CID 2. Note that, in cases of service flows already established by other MS's, steps 1004 to 1007 only perform the role of announcing to the MS the multicast CID 2 corresponding to the IP multicast address 2.

Step 1008: The MS obtains the multicast CID 2 through steps 1004 to 1007. Due to this, the MS becomes able to receive multicast data 2 that the BS is sending.

Step 1009: The MS sends DREG-REQ in order to shift to the idle mode. The DREG-REQ contains the paging cycle which is requested by the MS, that is, the request paging cycle. The BS that received the DREG-REQ sends an MS Info Req containing the request paging cycle.

Step 1010: The second paging information determining unit 34 in the GW obtains the request paging cycle by the MS from the PC/LR 20, obtains the first paging information determined for each channel from the first paging information determining unit 30, determines the paging information (second paging information) for the related MS based on both parameters, and sends a paging information change request for the MS to the PC/LR 20 (refer to FIG. 5). At this time, the second paging information determining unit 34 includes, in the paging information change request of the related MS, the MSID and paging information (second paging information) of the MS. Details on the "method for determining the second paging information" will be mentioned later.

Step 1011: The PC/LR of the GW announces the paging information by the MS Info Rsp. The BS announces the paging information to the MS by DREG-CMD. The MS shifts to the idle mode when it receives DREG-CMD.

Step 1012: The MS that received the DREG-CMD sets the paging cycle/offset based on the paging information contained in the DREG-CMD.

Step 1013: The MBS server 18 in the GW sends the multicast data 2 attached with the delivery time to the BS's in the MBS zone.

Step 1014: The multicast data delivery frame determining unit 32 in each BS in the MBS zone determines the multicast data delivery frames based on first paging information acquired in advance and broadcasts the multicast data 2 by the multicast CID 2. Details on the "method for determining the multicast data delivery frames" will be mentioned later.

Methods for Determining Second Paging Information

A method for determining second paging information in the second paging information determining unit 34 will be described next.

Figure 8:
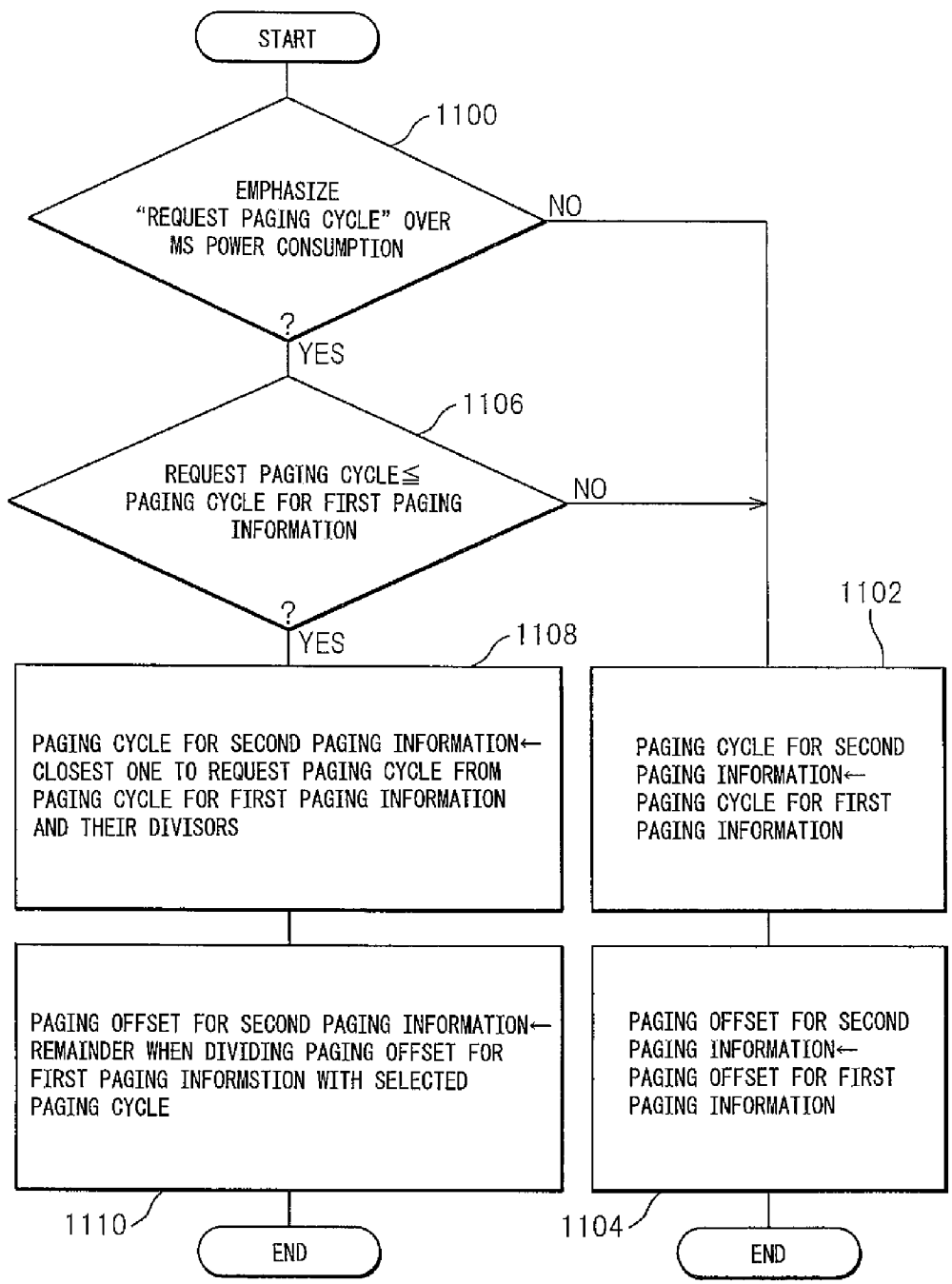
FIG. 8 is a flowchart illustrating an example of a method of determining second paging information.

FIG. 8 illustrates a flowchart for a method for determining second paging information.

The second paging information determining unit 34, when, for example, not stressing the request paging cycle from the MS (step 1100), need only obtain paging information corresponding to the changed multicast channel from the first paging information table of Table 1 and determine it as second paging information as it is (steps 1102 and 1104).

However, the second paging information does not have to have a paging cycle that is completely the same as the first paging information. When seeking to operate the system stressing the request paging cycle that the MS requests, the paging cycle of the second paging information may be determined taking into consideration the request paging cycle.

In this case, when the request paging cycle is shorter than the paging cycle in the first paging information in Table 1 (step 1106), the cycle closest to the request paging cycle among the paging cycle in the first paging information and its divisors is made the paging cycle of the second paging information (step 1108). Further, when a paging cycle different from the one of the first paging information is selected as a paging cycle of the second paging information, the remainder after dividing the paging offset of the first paging information by the selected paging cycle is made the paging offset for the second paging information (step 1110).

For example, when the first paging information paging cycle=50 frames, paging offset=27 frames, and request paging cycle=23 frames, the divisor of the paging cycle=50 frame, i.e. 25 frames, is the closest to the request paging cycle, so this is used as the paging cycle of the second paging information. Further, the remainder 2, from dividing 27 by 25, is made the paging offset of the second paging information. By doing so, for every 50 frames, one out of two appearing paging announcement monitoring frame intervals should be synchronized with the multicast data delivery frames. Conversely, since synchronization is partially unachieved, this is disadvantageous in terms of MS power consumption. If, as mentioned above, reduction of the MS power consumption is emphasized over the paging cycle which the MS requests, that is, shortening the paging response time, it is sufficient that the second paging information be set to have the exact same values as the first paging information irrespective of the request paging cycle (steps 1102 and 1104).

On the other hand, when the request paging cycle is larger than the paging cycle for the first paging information of Table 1 (step 1106), it is sufficient for the first paging information to be made the second paging information as it is (steps 1102 and 1104). When the request paging cycle is larger than the paging cycle for the first paging information of Table 1, it is also conceivable to set the paging cycle of the second paging information as a multiple of the paging cycle of the first paging information. However, even if the paging cycle is made larger, it will be necessary to receive the Multi-BS MBS-related frames at even shorter intervals than the larger paging cycle, so the MS power consumption cannot be made small. Accordingly, setting it the same as the paging cycle of the first paging information without making the paging cycle larger produces the merit of being able to shorten the paging response time. Note that, the embodiments do not exclude making the paging cycle of the second paging information a multiple of the paging cycle of the first paging information.

Method for Determining Multicast Data Delivery Frames

The method for determining the multicast data delivery frames executed by the multicast data delivery frame determining unit 32 will be explained next.

FIG. 9 illustrates a flowchart of the method for determining the multicast data delivery frames.

The unit 32 for determining the multicast data delivery frames obtains the first paging information of Table 1 in advance.

When the multicast data of a certain channel is received, the multicast data delivery frame determining unit 32 buffers a certain amount of data, then sends it to the MS. Conversely, the MBS server 18 estimates the delay caused by this buffering, then sets the delivery time to be attached to the multicast data.

First, the multicast data delivery frame determining unit 32 determines the frame numbers of the frames for sending the above buffered multicast data and the frame numbers for sending the related control frames necessary for sending the frames based on the delivery time (step 1200). Below, the frames for sending the multicast data and the related control frames necessary for sending them are collectively referred to as the Multi-BS MBS-related frames.

Next, the multicast data delivery frame determining unit 32 identifies Multi-BS MBS-related frames other than the Multi-BS MBS-related frames which are overlapping the frames for monitoring for paging announcements determined from the first paging information, at this stage, as controlled Multi-BS MBS-related frames which are to be adjusted (step 1202).

Next, for frames for monitoring for paging announcements (=destination frames) that do not overlap with Multi-BS MBS-related frames, the multicast data delivery frame determining unit 32, through the processing at steps 1206 to 1226, changes the frame number of the controlled Multi BS MBS-related frame which is the closest in frame distance from the destination frame so as to overlap with the destination frame. However, when doing so, change is allowable within a range where the transmission sequence of each frame of the Multi-BS MBS-related frame is not reversed. If this condition is not met, the controlled Multi-BS MBS-related frame to be adjusted that is the next closest in frame distance becomes the subject for changing the frame number. Similarly, when the conditions of the above transmission sequence reversal cannot be met, the frame for monitoring for paging announcements is not synchronized with the Multi-BS MBS-related frame, and the next frame for monitoring for paging announcements which does not overlapping with the Multi-BS MBS-related frames is made the subject to be processed.

When explaining this according to the flowchart of FIG. 9, first, one of the paging monitored frames that do not overlap with the Multi-BS MBS-related frames is specified as the destination frame (step 1206) and the count is set as 1 (step 1208). The controlled Multi-BS MBS-related frame to be adjusted closest in frame distance to the destination frame (one if there are a plurality) is specified as the frame number change candidate frame which is to be overlapped with the destination frame (step 1210). It is judged whether the frame sequence has been reversed when the frame number is changed (step 1212) and whether the amount of change of the frame number is less than a threshold value (step 1214). When the frame sequence is reversed or the amount of change of the frame number is less than the threshold value, if the count is less than a count threshold value (step 1216), the current frame number change candidate frame is excluded from the subject to be controlled (step 1218), the count is increment by "1" (step 1220), and the routine returns to the processing at step 1210. When the count reaches the count threshold value at step 1216, the control (adjustment) relating to the destination frame is relinquished and the next destination frame is identified (step 1226), then the processing at step 1208 is returned to. If the sequence has not been reversed and the amount of change of the frame number is below a threshold value at steps 1212 and 1214, the frame number of the frame number change candidate frame is changed to the frame number of the destination frame (step 1222), the change candidate frame is excluded from the subject of control (adjustment) (step 1224), and the routine proceeds to the processing of step 1226.

By the above, the transmission timing of the Multi-BS MBS-related frames from a BS can be synchronized with the frames for monitoring for paging announcements of the MS in the idle mode. Note that, at step 1214, the reason the amount of change of the frame number is limited is to prevent large multicast data jitter.

Second Embodiment

In the above first embodiment, a multicast data delivery frame determining unit 32 for determining the frame numbers of the multicast data delivery frames is provided in the BS 16. In this embodiment, as illustrated in FIG. 10, this multicast data delivery frame determining unit 32 is installed not in the BS 16 but in the GW 12. Accordingly, as illustrated in FIG. 6, in the first embodiment, the multicast data 22 with the delivery time attached is sent from the GW 12 to the BS 16, but in the present embodiment, as illustrated in FIG. 11, the multicast data 40 with the frame number already determined is sent, while the first paging information 36 determined for each multicast channel is not sent (refer to FIG. 6).

In the present embodiment, the synchronization of the frame numbers is achieved not only between the BS's, but also achieved among the pluralities of BS's and GW's.

In the present embodiment, as illustrated in FIG. 10, the GW 12 is provided with a multicast data delivery frame determining unit 32, while the BS 16 is provided with a multicast data delivery unit 42. If the multicast data delivery frame determining unit 32 of the GW 12 obtains multicast data from the MBS server 18, the first paging information, for the multicast channel, which sends the multicast data is obtained from the first paging information determining unit 30, the transmission frame number is determined and assigned to the multicast data, and the data is sent to the multicast data delivery unit 42 of the BS 16. It is not necessary for the multicast data delivery frame determining unit 32 to assign a delivery time to the multicast data which is obtained from the MBS server 18. The multicast data delivery frame determining unit 32 buffers data to a certain degree in the order of reception by the MBS server 18 and determines the transmission frame number by a method similar to the above first embodiment. However, since no delivery time is announced from the MBS server 18, the multicast data delivery frame determining unit 32 maps the multicast data in a continuous train of frames at the same intervals as the reception of data by the MBS server 18. It then first provisionally determines the transmission frame numbers of the frames, then similar to the above first embodiment, changes the transmission frame numbers based on the first paging information, and determines final transmission frame numbers.

The multicast data delivery unit 42 of the BS 16 sends multicast data to the MS according to the received delivery frame numbers.

Third Embodiment

The present embodiment discloses the method of announcing second paging information to an MS in the idle mode when changing the first paging information by the request from the network side as in the case when changing the data characteristics of the multicast channel.

In the present embodiment, in order to announce paging information to the MS, a paging announcement requesting a LU (Location Update) is sent to the MS. Due to this, the MS executes the LU and, through the LU, changes the paging information of the MS.

Announcing the paging information of the MS, as in the above method, allows the MS to change paging information without leaving idle mode.

Below, this will be explained along with the sequence of FIG. 12.

Step 1301: The GW changes the first paging information illustrated in Table 1. As reasons for the change, there may be mentioned cases where data characteristics for multicast channels are changed.

Step 1302: The second paging information determining unit 34 of the GW (FIG. 5 or FIG. 10) requests the PC/LR 20 to send paging announcements requesting LUs to all MS receiving channels to be changed (hereinafter, the "group of MS's"). Next, the PC/LR 20 sends paging announcements addressed to the corresponding group of MS's to all BS's in the same paging group. The "Paging Cause" column of the paging announcement indicates the Location Update (LU). This means that it is a message that does not request the group of MS's to leave idle mode and receive paging data, but requests the group of MS's to execute a LU capable of changing paging information of the group of MS's. That is, the PC/LR instructs the group of MS's to execute LUs, whereby the paging information of the group of MS's is changed. The BS's receiving the paging announcement (LU request) broadcast the MOB_PAG-ADV. The "Action Code" column of the MOB_PAG-ADV indicate 0b01. This indicates that it is a message carrying out a LU request to the group of MS's. The next steps 1303 to 1307 illustrate the LU processing overall.

Step 1303: The MS sends the RNG-REQ. The Bit#1 of the Ranging Purpose Indication of this RNG-REQ is "1", which indicates an LU. Further, this RNG-REQ includes a paging cycle which the MS requests, that is, a request paging cycle. A BS receiving this RNG-REQ sends an LU request including the request paging cycle.

Step 1304: The second paging information determining unit 34 of the GW determines the paging information of the related MS according to the flow illustrated in FIG. 8 and announces it to the PC/LR.

Step 1305: The PC/LR of the GW announces the paging information by the LU Response. The BS announces the paging information to the MS by the RNG-RSP.

Step 1306: The BS announces the fact that RNG-RSP was sent to the MS to the GW via the LU Confirm.

Step 1307: The MS receiving the RNG-RSP changes the paging information of the MS to the paging information included in the RNG-RSP.

Fourth Embodiment

In the embodiments up until now, it had been necessary to shift from the idle mode to the normal mode in order to select a multicast channel or change the selection, however, in the present embodiment, a Location Update message is sent and received to announce a change of the incoming multicast channel and acquire a multicast CID so that an MS in the idle mode can change the incoming multicast channel without leaving idle mode.

In the present embodiment, the message specifications in the IEEE 802.16e standard are modified, and the multicast channel is transported by the RNG-REQ while the multicast CID is transported by the RNG-RSP.

Below, this will be explained along with the sequence of FIG. 13.

Step 1401: The MS changes the incoming channel to the channel 2.

Step 1402: The MS sends the RNG-REQ including the channel number which it desires to receive. Except for including the desired reception channel number, the RNG-REQ is the same as in step 1303 of FIG. 12.

The BS receiving an RNG-REQ sends an LU Request including the desired reception channel number (channel 2). This RNG-REQ and LU Request are the same as the RNG-REQ and LU Request at step 1303 of FIG. 12 except for including the desired reception channel number.

Step 1403: The second paging information determining unit 34 of the GW (FIG. 5 or FIG. 10) detects the change of the incoming multicast channel of the MS.

Step 1404: The second paging information determining unit 34 of the GW determines the paging information of the related MS according to the flow illustrated in FIG. 8 and announces the determined information to the PC/LR.

Step 1405: The PC/LR of the GW announces, by the LU Response, the paging information and the incoming channel number (channel 2). The BS announces by the RNG-RSP the paging information and multicast CID 2 corresponding to the channel 2 to the MS.

Step 1406: The BS announces the fact that RNG-RSP was sent to the MS via the LU Confirm to the GW.

Step 1407: The MS obtains the multicast CID 2 through the RNG-RSP.

Step 1408: The MS receiving the RNG-RSP changes the paging information of the MS to the paging information included in the RNG-RSP.

Steps 1409 to 1410: These are the same as steps 1013 to 1014 of FIG. 7.

According to the above-explained embodiments, by synchronizing the transmission timing, from the BS, of the Multi-BS MBS-related frames with frames for monitoring for paging announcements of the MS in the idle mode, it is possible to reduce the frames needed to be received, which realizes lower power consumption of the MS.

Further, the frames for monitoring for paging announcements of the MS in the idle mode, taking into account the request paging cycle of the MS, can be adapted to the first paging information determined for each multicast channel.

Further, a preferable paging cycle can be determined depending on the data characteristics of the multicast channels.

Further, Multi-BS MBS-related frame jitter can be suppressed while synchronizing the transmission timing from the BS of Multi-BS MBS-related frames with the frames for monitoring for paging announcements of the MS in the idle mode.

Further, when changing the first paging information determined for each multicast channel, the MS can change paging information without leaving the idle mode.

Further, the MS in the idle mode can change incoming channels without leaving the idle mode.

What is claimed is:

1. A base station using any frame of an incoming group of frames which a mobile station intermittently receives to send a paging announcement to the mobile station, said base station comprising a transmitter unit enabling, for the mobile station, to receive a multicast-related data when the mobile station receives the incoming group of frames, by sending, from the transmitter, the multicast-related data necessary to receive a multicast data by the mobile station by using any of the incoming group of frames, wherein the transmitter is operative to synchronize a transmission timing of the multicast-related data with a frame for monitoring paging announcements to the mobile station in the idle mode, the transmission timing of the incoming group of frames is determined based on a paging cycle requested by the mobile station individually, and the multicast data is transmitted according to a transmission cycle characteristics determined for respective multicast channels and received by a plurality of mobile stations including said mobile station, where the multicast-related data includes the multicast data MBS-DATA which is a content required by the mobile station and a MBS-DATA IE which indicates a frame for delivering the MBS-DATA.

2. The base station as set forth in claim 1, wherein the multicast-related data includes information necessary for reception of multicast data.

3. An apparatus designating an incoming group of frames intermittently received by a mobile station, said apparatus comprising a notifying unit notifying, when a base station is transmitting multicast-related data necessary for receiving multicast data using any frame of a predetermined group of frames, the mobile station so that the mobile station intermittently receives a group of frames which is a group of frames containing the predetermined group of frames, wherein the apparatus is operative to synchronize a transmission timing of the multicast-related data with a frame for monitoring paging announcements to the mobile station in the idle mode, the transmission timing of the incoming group of frames is determined based on a paging cycle requested by the mobile station individually, and the multicast data is transmitted according to a transmission cycle characteristics determined for respective multicast channels and received by a plurality of mobile stations including said mobile station, where the multicast-related data includes the multicast data MBS-DATA which is a content required by the mobile station and a MBS-DATA IE which indicates a frame for delivering the MBS-DATA.

4. A mobile station capable of receiving multicast data, said mobile station comprising:

a receiver unit receiving an announcement of an incoming group of frames intermittently received from a base station and receiving the incoming group of frames according to the announcement of the incoming group of frames; and a control unit controlling the receiver unit so as to receive the multicast data by the receiver unit in accordance with the multicast-related data, when multicast-related data is contained in a frame upon receipt of the frame belonging to the incoming group of frames by the receiver unit, wherein a transmission timing of the multicast-related data is synchronized with a frame for monitoring paging announcements to the mobile station in the idle mode, the transmission timing of the incoming group of frames is determined based on a paging cycle requested by the mobile station individually, and the multicast data is transmitted according to a transmission cycle characteristics determined for respective multicast channels and received by a plurality of mobile stations including said mobile station, where the multicast-related data includes the multicast data MBS-DATA which is a content required by the mobile station and a MBS-DATA IE which indicates a frame for delivering the MBS-DATA.

* * * * *